US012042816B2

(12) United States Patent
Davidson et al.

(10) Patent No.: US 12,042,816 B2
(45) Date of Patent: Jul. 23, 2024

(54) SYSTEMS AND METHODS FOR MATERIAL DISPENSING CONTROL

(71) Applicant: Coherix, Ann Arbor, MI (US)

(72) Inventors: Douglas Davidson, Grandville, MI (US); Benjamin Coffer, Dexter, MI (US)

(73) Assignee: Coherix, Ann Arbor, MI (US)

( * ) Notice: Subject to any disclaimer, the term of this patent is extended or adjusted under 35 U.S.C. 154(b) by 381 days.

(21) Appl. No.: 17/409,621

(22) Filed: Aug. 23, 2021

(65) Prior Publication Data

US 2023/0056384 A1 Feb. 23, 2023

(51) Int. Cl.
*B05C 5/02* (2006.01)
*B05C 11/10* (2006.01)

(52) U.S. Cl.
CPC .......... *B05C 5/0225* (2013.01); *B05C 5/0216* (2013.01); *B05C 11/1013* (2013.01)

(58) Field of Classification Search
CPC ................ B05C 5/0225; B05C 5/0216; B05C 11/1013; B05C 11/1005; B05D 1/26
See application file for complete search history.

(56) References Cited

U.S. PATENT DOCUMENTS 5,857,589 A * 1/1999 Cline .................. B05C 11/1005 222/63
11,400,594 B2 * 8/2022 Sun ....................... G06T 19/006
2003/0209560 A1 * 11/2003 Hui ......................... H01L 24/83 222/1
2004/0175832 A1 * 9/2004 Hui .................. H01L 21/67253 382/128
2005/0107994 A1 * 5/2005 Wan ........................ G06F 30/23 703/2
2008/0149691 A1 * 6/2008 Fujii ................. H05K 13/0465 228/33
2010/0250011 A1 * 9/2010 Burkus ................ B05C 5/0225 700/283
2015/0209960 A1 * 7/2015 Li ........................... G06F 30/20 700/250
2018/0281284 A1 * 10/2018 Elgar .................... B29C 64/371
2020/0054440 A1 * 2/2020 Aguilar .................. B33Y 10/00
2020/0078945 A1 * 3/2020 Sun .......................... B25J 9/163
2020/0291469 A1 * 9/2020 Almogy ............... C12Q 1/6809
2021/0002793 A1 * 1/2021 Nyaribo ................. B33Y 70/00
2021/0197225 A1 * 7/2021 Van De Vijver .... B05C 11/1005
(Continued)

*Primary Examiner* — Ramesh B Patel
(74) *Attorney, Agent, or Firm* — Dickinson Wright PLLC

(57) ABSTRACT

A method includes receiving a model of the material dispenser and, at a first characterization period of a material bead dispensing operation, communicating, to the material dispenser, a first characterization flow rate input. The method also includes, at a second characterization period of the material bead dispensing operation, communicating, to the material dispenser, a second characterization flow rate input. The method also includes generating, using at least one sensor, three-dimensional data associated with a material bead corresponding to the material bead dispensing operation. The method also includes characterizing at least one parameter of the model of the material dispenser using at least the first characterization flow rate input, the second characterization flow rate input, and the three-dimensional data associated with the material bead.

19 Claims, 7 Drawing Sheets

(56) References Cited

U.S. PATENT DOCUMENTS

| | | | | |
|---|---|---|---|---|
| 2021/0199647 | A1* | 7/2021 | Beckett | C12Q 1/6869 |
| 2022/0000212 | A1* | 1/2022 | Busbee | A43B 3/34 |
| 2023/0150030 | A1* | 5/2023 | Brown | B22F 10/77<br>134/2 |

* cited by examiner

SYSTEMS AND METHODS FOR MATERIAL DISPENSING CONTROL

TECHNICAL FIELD

This disclosure relates to material dispensing and in particular to systems and methods for material dispensing control.

BACKGROUND OF THE INVENTION

Increasingly, various a manufacturing and/or assembly processes include the application of one or more materials to a surface of one or more components of an assembly. For example, in the automotive industry, components, such as windows, body panels, and the like, may be mated with and/or connected to other components of an automotive assembly. During assembly, one or more material beads (e.g., comprising such materials as adhesives, sealants, and the like) may be applied to one or more of the components. The component may be assembled, with the material bead providing adhesive features, sealing features, and/or other suitable material features.

During a material bead dispensing operation (e.g., which includes dispensing material to form a material bead on a corresponding component of an assembly), a robotic mechanism, such as a robotically controlled arm or other suitable robot or robotic mechanism, may cooperatively operate with a material dispenser to form the material bead on the component. For example, the robotic mechanism may receive program instructions with cause the robotic mechanism to traverse a defined path. An output of the material dispenser may be coupled or otherwise attached to the robotic mechanism or the robotic mechanism may be coupled or otherwise attached to the component, such that, as the robotic mechanism traverses the defined path, the output of the material dispenser also traverses the defined path or the dispenser remains substantially stationary while the robotic mechanism moves the component. The material dispenser may, according to a flow rate, dispense material along the defined path, forming the material bead.

SUMMARY OF THE INVENTION

This disclosure relates generally to digital messaging.

An aspect of the disclosed embodiments includes a method for characterizing a material dispenser. The method includes receiving a model of the material dispenser and, at a first characterization period of a material bead dispensing operation, communicating, to the material dispenser, a first characterization flow rate input. The method also includes, at a second characterization period of the material bead dispensing operation, communicating, to the material dispenser, a second characterization flow rate input. The method also includes generating, using at least one sensor, three-dimensional data associated with a material bead corresponding to the material bead dispensing operation. The method also includes characterizing at least one parameter of the model of the material dispenser using at least the first characterization flow rate input, the second characterization flow rate input, and the three-dimensional data associated with the material bead.

Another aspect of the disclosed embodiments includes an apparatus for characterizing a material dispenser. The apparatus includes a processor and a memory. The memory includes instructions that, when executed by the processor, cause the processor to: receive a model of the material dispenser; at a first characterization period of a material bead dispensing operation, communicate, to the material dispenser, a first characterization flow rate input; at a second characterization period of the material bead dispensing operation, communicate, to the material dispenser, a second characterization flow rate input; generate, using at least one sensor, three-dimensional data associated with a material bead corresponding to the material bead dispensing operation; and characterize at least one parameter of the model of the material dispenser using at least the first characterization flow rate input, the second characterization flow rate input, and the three-dimensional data associated with the material bead.

Another aspect of the disclosed embodiments includes a system that includes a material dispenser configured to dispense a material bead. The system also includes a controlling mechanism configured to: receive a model of the material dispenser; at a first characterization period of a material bead dispensing operation, communicate, to the material dispenser, a first characterization flow rate input; at a second characterization period of the material bead dispensing operation, communicate, to the material dispenser, a second characterization flow rate input; generate, using a plurality of sensors, three-dimensional data associated with a material bead corresponding to the material bead dispensing operation; and characterize at least one parameter of the model of the material dispenser using at least the first characterization flow rate input, the second characterization flow rate input, and the three-dimensional data associated with the material bead.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
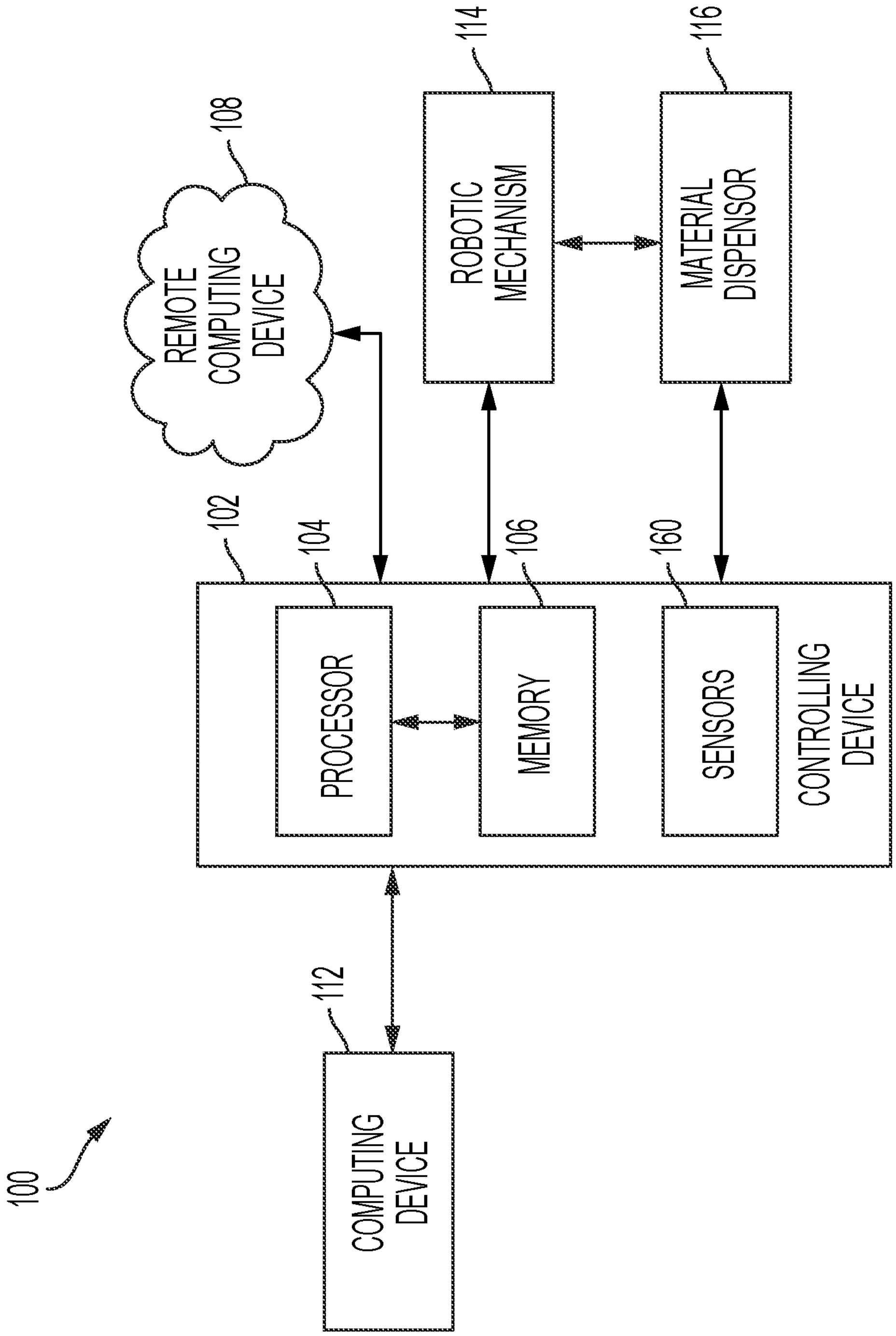
FIG. 1 generally illustrates a material dispensing system according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, increasingly, various manufacturing and/or assembly processes include the application of one or more materials to a surface of one or more components of an assembly. For example, in the automotive industry, components, such as windows, body panels, and the like, may be mated with and/or connected to other components of an automotive assembly. During assembly, one or more material beads (e.g., comprising such materials as adhesives, sealants, and the like) may be applied to one or more of the components. The component may be assembled, with the material bead providing adhesive features, sealing features, and/or other suitable material features.

During a material bead dispensing operation (e.g., which includes dispensing material to form a material bead on a corresponding component of an assembly), a robotic mechanism, such as a robotically controlled arm or other suitable robot or robotic mechanism, may cooperatively operate with a material dispenser to form the material bead on the component. For example, the robotic mechanism may receive program instructions, which cause the robotic mechanism to traverse a defined path. An output of the material dispenser may be coupled or otherwise attached to the robotic mechanism or the robotic mechanism may be coupled or otherwise attached to the component, such that, as the robotic mechanism traverses the defined path, the output of the material dispenser also traverses the defined path or the dispenser remains substantially stationary while the robotic mechanism moves the component. The material dispenser may, according to a flow rate, dispense material along the defined path, forming the material bead.

However, during such material dispensing operations, various characteristics of the material dispensing, the robotic mechanism, the material being dispensed, the ambient temperature of the system comprising the robotic mechanism and the material dispenser, the barometric pressure associated with the system, and the like, may affect the desired aspects of the material bead. For example, the material dispenser may dispense the material at a slight variance from the flow rate input (e.g., an input indicating a desired rate at which the material is dispensed, which may include a suitable signal or other suitable input), which may cause inaccuracies in the material bead.

Additionally, or alternatively, the material dispenser may respond to a flow rate input to maintain consistent material volume even as the robotic mechanism changes speed. However, the robotic mechanism may often accelerate and decelerate faster than a material dispenser can reasonably respond. Depending on the dispenser technology of the material dispenser, changes in temperature and humidity can cause significant changes in dispensed volume of the material, as can changes in material viscosity from the top to bottom of material barrels (e.g., containers configured to hold material ready to be dispensed by the material dispenser) and between material barrels.

Accordingly, systems and methods, such as those described herein, configured to control various aspects of the dispensing system comprising the robotic mechanism and the material dispenser, may be desirable. In some embodiments, the systems and methods described herein may be configured to provide material bead inspection and process control. The systems and methods described herein may be configured to use one or more (e.g., such as one, two, three, four, and so on) sensors (e.g., such as laser triangulation sensors, image capturing sensors or devices, and the like) that substantially completely surround the output of the material dispenser (e.g., which may be referred to herein as a dispense nozzle) to substantially continuously measure the material bead and component surface, regardless of travel direction. Additionally, or alternatively, the systems and methods described herein may be configured to use one or more laser triangulation sensors (e.g., or other suitable sensors) that trail a material bead as the material bead is being applied to the component (e.g., such as in scenarios where the material bead is a straight bead having little to no change in direction).

In some embodiments, the systems and methods described herein may be configured to maintain correct material bead volume, which may reduce or eliminate relatively lengthy trial-and-error setup processes. In some embodiments the systems and methods described herein may be configured to calculate a material volume at every point along the material bead one or more scans (e.g., using the one or more sensors) of the material bead.

The systems and methods described herein may be configured to, using a dynamical model of the dispensing system calculated during a characterization operation, combined with the actual sensed measurements over multiple scans, directly control the flow rate input to the material dispenser, anticipating when and by how much to change the flow rate input to achieve desired volume results.

In some embodiments, the systems and methods described herein may be configured to, receive desired material bead volume, from a human machine interface (HMI), at multiple locations of the material bead. For example, a user of the dispensing system may use the HMI to interact with the dispensing system. The user may select sections of the material bead and may specify material bead volume for each of the selected sections. The user may then run several part cycles to allow the dispensing system to automatically adapt the dispense process to maintain the correct volumes at the correct locations.

In some embodiments, the systems and methods described herein may be configured to characterize dynamics of the material dispenser without running part cycles (e.g., a special "part" cycle may be run that dispenses a "throw away" bead that is deliberately perturbed to reveal the dynamical behavior of the entire dispensing system). This may reduce or eliminate the need for an experienced dispensing expert to adjust aspects of the dispensing system in a time-consuming, trial-and-error fashion.

In some embodiments, the systems and methods described herein may be configured to provide straightforward dispenser characterization, which may be used to optimize overall performance of the dispensing system. The systems and methods described herein may be configured to substantially continuously fine tune the dynamical model of the material dispenser during production on the actual parts. The systems and methods described herein may be configured to provide a graphical user interface to visually adjust the material bead size along any section (e.g., or zone) of the material bead. The systems and methods described herein may be configured to maintain the material bead volume (e.g. including around relatively tight corners and over temperature and/or humidity variation).

In some embodiment, the systems and methods described herein may be configured to provide the flow rate input to the material dispenser via the robotic mechanism and/or via an external, digital to analog converter (e.g., such as an Ethernet-connected 0-10 volts direct current digital to analog converter or other suitable digital to analog converter).

In some embodiments, the systems and methods described herein may be configured to provide a series of flow rate inputs at different frequencies and ramp rates to the material dispenser. The systems and methods described herein may be configured to user feedback from the internal sensors of the material dispenser to create a dynamical model of the material dispenser characteristics.

The systems and methods described herein may be configured to control flow, pre-pressure, and other material dispenser specific parameters to enhance performance (e.g., by reducing or eliminating pooling at the beginning and end of the material bead and/or on stitches of the material bead). The systems and methods described herein may be configured to use a bi-directional communication channel to the material dispenser, which may allow the material dispenser to send control parameters to the controlling device.

In some embodiments, the systems and methods described herein may be configured to adapt to changes in material and dispensing equipment inherent in the dispensing process, which may reduce or eliminate system downtime. The systems and methods described herein may be configured to accommodate variation sources, such as temperature, material viscosity, process variation, and the like. The systems and methods described herein may be configured to operate the robotic mechanism at maximum practical speeds as variation is managed. The systems and methods described herein may be configured to accommodate new assembly programs (e.g., such as vehicle assembly programs and the like), which may require less equipment, reduced capital investment, constrained floor space, reduced labor, and the like.

In some embodiments, the systems and methods described herein may be configured to streamline production start-up. The systems and methods described herein may be configured to use an artificial intelligence engine configured to use a machine learning model after a period of non-use (e.g., such as a weekend, holiday, work stoppage, and the like) to ensure that quality material beads can be dispensed immediately upon work start-up. The systems and methods described herein may be configured to manage material and dispensing process variation using local software, which may reduce or eliminate significant shop floor intervention by robot programmers, maintenance personnel, operators, and the like.

In some embodiments, the systems and methods described herein may be configured to provide Variable bead control. For example, the user of the dispensing system may interact with the controlling device HMI to create desired bead dimensions per zone without the need of a robot programmer or maintenance personnel. The systems and methods described herein may be configured to substantially continuously monitor and dispense the specified material bead in the specified zones, optimizing material usage by producing quality beads and reducing or eliminating squeeze out.

The systems and methods described herein may be configured to reduce or eliminate "boil-out" issues (e.g., such as in paint shop or other suitable location) due to inconsistent material beads. The systems and methods described herein may be configured to reduce contamination in an e-coat tank, reducing painted surface defects. The systems and methods described herein may be configured to reduce or eliminate redundant secondary hem over sealing, which may result in significant labor and material cost savings.

In some embodiments, the systems and methods described herein may be configured to learn the dynamical behavior unique to the dispenser system using a corresponding machine learning model. The systems and methods described herein may be configured to use that knowledge to predictively control the behavior of the material dispenser. The systems and methods described herein may be configured to ensure a high quality material bead of the proper volume is actually dispensed in each zone on the component, while adapting to changes in material, environment and/or process.

Figure 3:
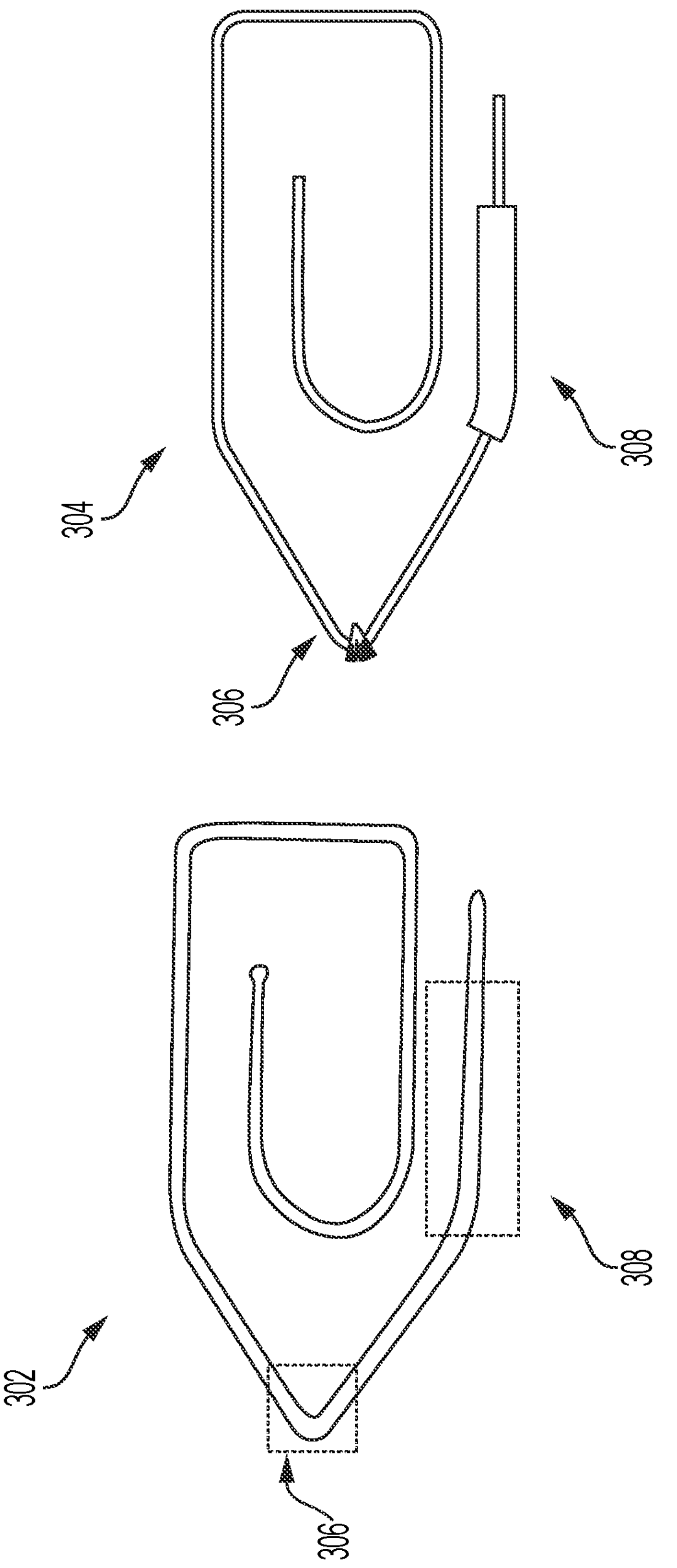
FIG. 3 generally illustrates a material bead according to the principles of the present disclosure.
Figure 4:
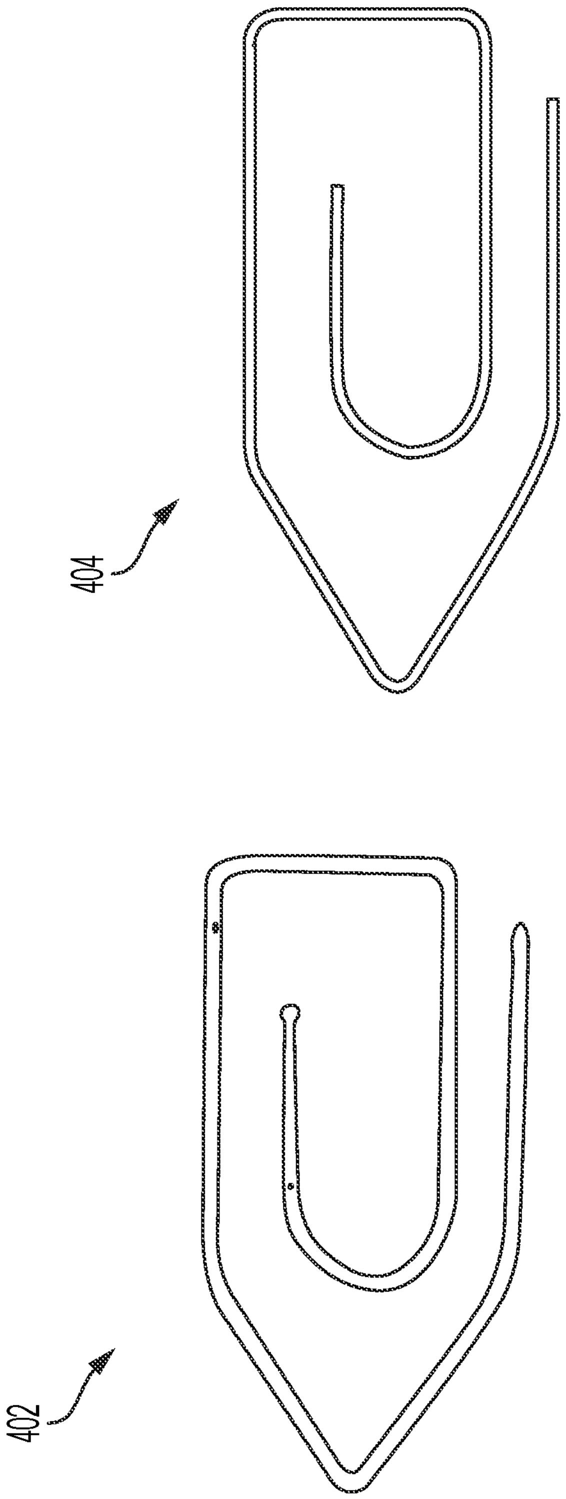
FIG. 4 generally illustrates a material bead according to the principles of the present disclosure.
Figure 5:
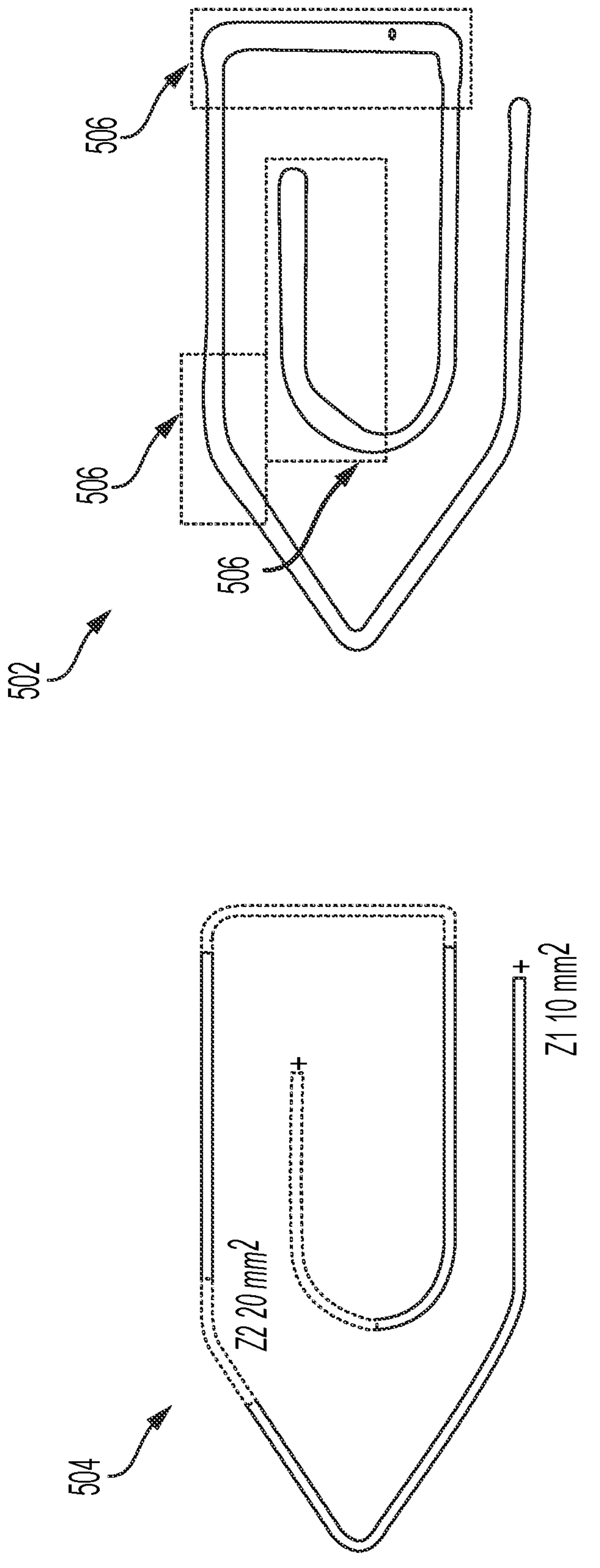
FIG. 5 generally illustrates a material bead according to the principles of the present disclosure.

In some embodiments, the systems and methods described herein may be configured to generate new dispenser flow rate inputs for the next component based on previous component inspections. FIGS. 3-5 generally illustrate sample material beads and inspection thereof. As is generally illustrated, a material bead 302 may represent a best effort bead dispensed prior to characterization of various parameters of a model representing the material dispenser. A consistent 10 $mm^2$ bead diameter may be desired for the material bead 302.

However, the robotic mechanism speed may dictate the flow rate input, resulting to an inconsistent material bead volume, for example, at 306 and 308. The systems and methods described herein may be configured to generate the inspection image 304 indicating the inconsistent material bead volumes 306 and 308. The systems and methods described herein may be configured to use the controlling device, which uses various sensors, to analyze the material bead 302 and identify the inconsistent volumes 306 and 308.

In some embodiments, the systems and methods described herein may be configured to characterize parameters of the model of the material dispenser, as described herein. In FIG. 4, a material bead 402 is generated using the characterized model of the material dispenser. For example, the controlling mechanism may generate the flow rate input based on a flow rate command using the characterized model. The systems and methods described herein may be configured to generate the image 404, which may indicate a positive inspection of the material bead 402.

In some embodiments, as is generally illustrated in FIG. 5, the systems and methods described herein may be configured to use Customized material bead profiles in different zones. For example, the material bead 502 includes sections 506, which may correspond to sections selected by the user, using the HMI. The user may specify a volume size for the sections 506. The systems and methods described herein may be configured to provide the provided volume for each section 506 (e.g., which may be the same or different volumes). An inspection 504 may indicate that the sections 506 include the desired volumes.

In some embodiments, the systems and methods described herein may be configured to receive a model of the material dispenser. The systems and methods described herein may be configured to, at a first characterization period of a material bead dispensing operation, communicate, to the material dispenser, a first characterization flow rate input. The systems and methods described herein may be configured to, at a second characterization period of the material bead dispensing operation, communicate, to the material dispenser, a second characterization flow rate input.

The first characterization flow rate input and the second characterization flow rate input may correspond to a step function, wherein the first characterization flow rate input and second characterization flow rate input may include arbitrary values, and/or the first characterization flow rate input and the second characterization flow rate input may relate to one another in any suitable fashion or be unrelated to one another.

The systems and methods described herein may be configured to generate, using at least one sensor (e.g., such as at least one laser, at least one image capturing device, and the like), three-dimensional data associated with a material bead corresponding to the material bead dispensing operation. The systems and methods described herein may be configured to characterize at least one parameter of the model of the material dispenser using at least the first characterization flow rate input, the second characterization flow rate input, and the three-dimensional data associated with the material bead. The three-dimensional data may correspond to at least one portion of the material bead comprising a predefined pattern, such as a straight line, or other suitable pattern.

The systems and methods described herein may be configured to revise the model of the material dispenser by updating the at least one parameter of the model of the material dispenser. The systems and methods described herein may be configured to store the revised model of the material dispenser.

The systems and methods described herein may be configured to generate, in response to receiving a material dispense command, a material dispense flow rate input according to the revised model of the material dispenser. The systems and methods described herein may be configured to generate, using the at least one sensor, three-dimensional data associated with at least one other material bead corresponding to another material bead dispensing operation associated with the material dispense flow rate input.

In some embodiments, the systems and methods described herein may be configured to iteratively revise the model of the material dispenser using, at least, three-dimensional data, generated using the at least one sensor, associated with a plurality of other material beads corresponding to other material bead dispensing operations.

With reference to FIG. 1, a material dispensing system 100 according to the principles of the present disclosure, is generally illustrated. The system 100 may include a controlling device 102. The controlling device 102 may include a processor 104 and a memory 106. The processor 104 may include any suitable processor, such as those described herein. Additionally, or alternatively, the controlling device 102 may include any suitable number of processors, in addition to or other than the processor 104.

The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, perform the functions associated with the systems and methods described herein.

Figure 2:
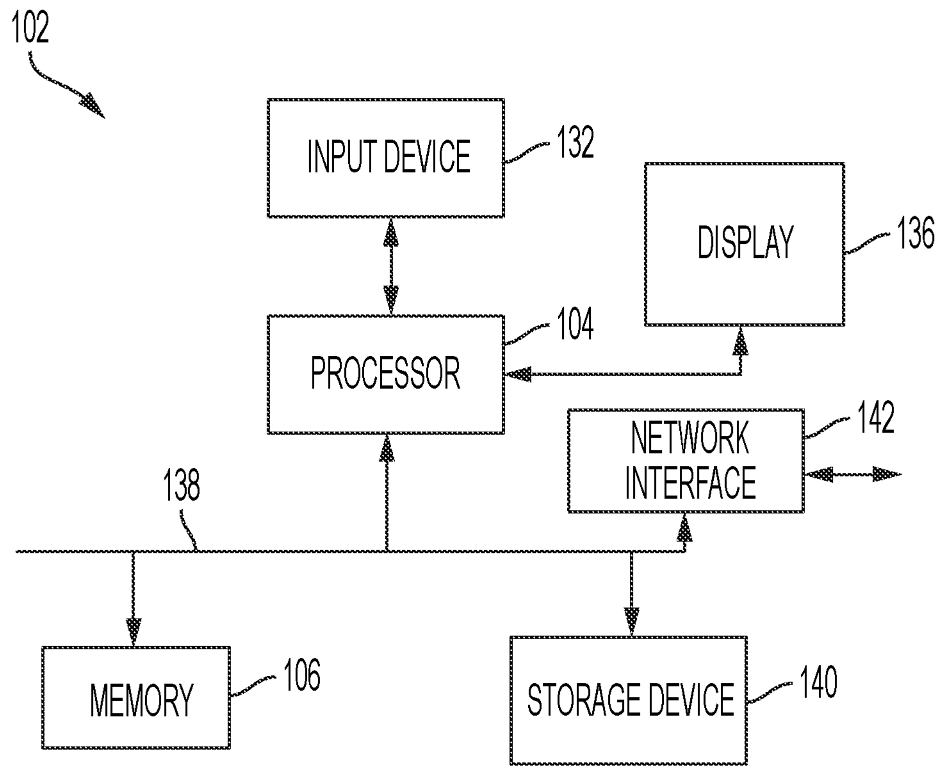
FIG. 2 generally illustrated a controlling device according to the principles of the present disclosure.

The controlling device 102 may include or be in communication with a user input device 132, as is generally illustrated in FIG. 2, which may be configured to receive input from a user of the controlling device 102 and to communicate signals representing the input received from the user to the processor 104. For example, the user input device 132 may include a button, keypad, dial, touch screen, audio input interface, visual/image capture input interface, input in the form of sensor data, etc.

In some embodiments, the user input device 132 may be associated with a computing device 112 of the system 100. The computing device 112 maybe associated with user of the system 100. The computing device 112 may include any suitable computing device including a mobile computing device (e.g., a smart phone, tablet, or other suitable mobile computing device), a laptop-computing device, a desktop computing device, or any other suitable computing device. The computing device 112 may be used by the user to communicate and/or interact with the controlling device 102 or other suitable aspects of the system 100. The computing device 112 may be proximately located to the controlling device 102 or remotely located from the controlling device 102.

The controlling device 102 may include or be in communication with, via the computing device 112, a display 136 that may be controlled by the processor 104 and/or the computing device 112 to display information to the user. A data bus 138 may be configured to facilitate data transfer between, at least, a storage device 140 and the processor 104. The controlling device 102 may also include a network interface 142 configured to couple or connect the controlling device 102 to various other computing devices or network devices via a network connection, such as a wired or wireless connection, or other suitable connection. In some embodiments, the network interface 142 includes a wireless transceiver or other suitable mechanism.

The storage device 140 may comprise a single disk or a plurality of disks (e.g., hard drives), one or more solid-state drives, one or more hybrid hard drives, and the like. The storage device 140 may include a storage management module that manages one or more partitions within the storage device 140. In some embodiments, storage device 140 may include flash memory, semiconductor (solid state) memory or the like. In some embodiments, the storage device 140 may be remotely located from the controlling device 102, such as on the computing device 112, on a remotely located computing device, a database, a data center, or other suitable location.

The controlling device 102 may communicate with a remote computing device 108. The remote computing device 108 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 108 may be remotely located from the controlling device 102, such as in a datacenter or other suitable location.

In some embodiments, the controlling device 102 receives a model of a material dispenser 116. For example, the controlling device 102 may receive the model from the remote computing device 108, the computing device 112, or other suitable location. The material dispenser 116 may include any suitable material dispenser configured to dispense material beads onto an assembly component, as described. The controlling device may, selectively control the material dispenser 116 and/or a robotic mechanism 114 to perform a material bead dispensing operation. The robotic mechanism 114 may include any suitable robot configured to traverse a predefined path (e.g., following a program), with the output (e.g., dispensing nozzle) of the material dispenser 116 (e.g., while the output of the material dispenser 116 is coupled or otherwise attached to the robotic mechanism 114). Additionally, or alternatively, the robotic mechanism 114 may be configured to be coupled, attached to, or otherwise engaged with the component. The robotic mechanism 114 may move the component according to the program while the material dispenser 116 remains stationary or substantially stationary. The material dispenser 116 may dispense material onto the component as the robotic mechanism 114 moves the component.

Figure 6:
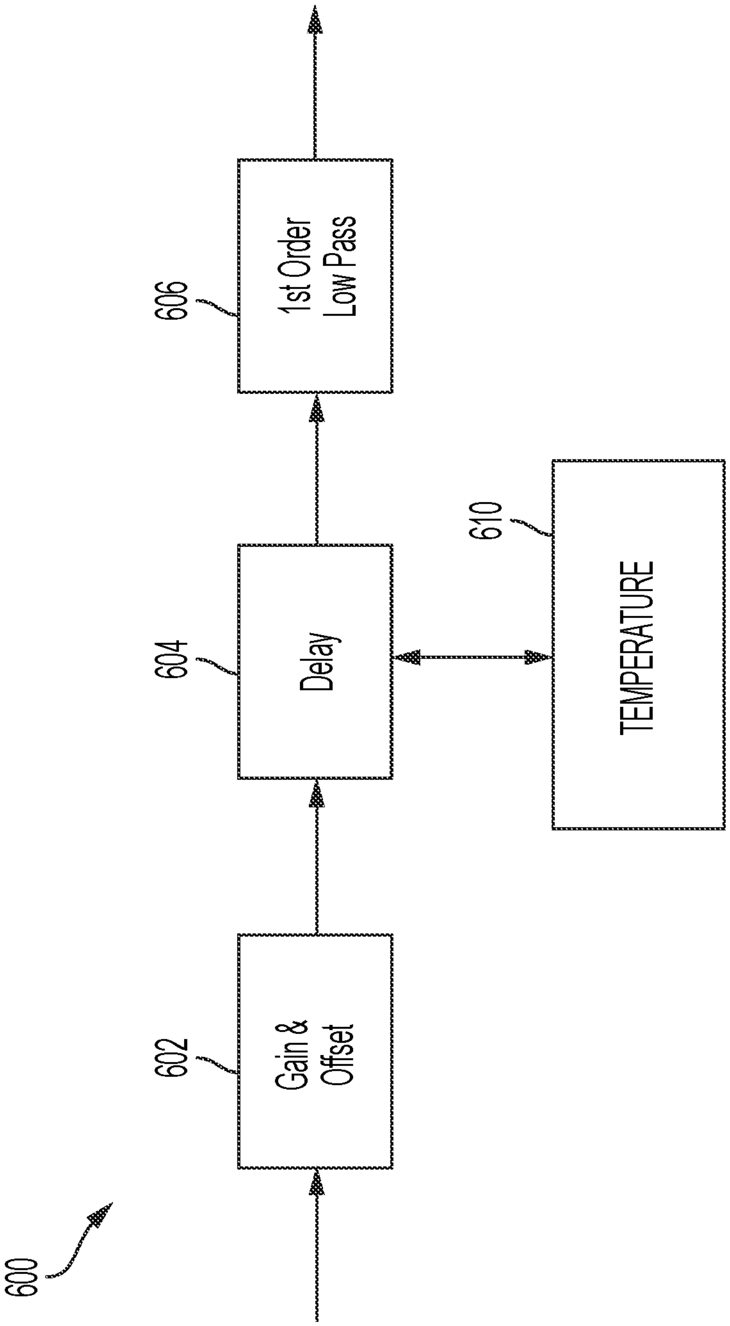
FIG. 6 generally illustrates a model of principal dispenser according to the principles of the present disclosure.

The model of the material dispensing 116 may include any suitable model, such a model 600 as is generally illustrated in FIG. 6. The model 600 may be configured to mathematically represent parameters of the material dispenser 116. For example, the model 600 may include a gain and offset parameter 602, a delay parameter 604, and a first order low pass parameter 606. In some embodiments, the model 600 may include a temperature parameter 610, which may represent ambient temperature associated with the material dispenser 116 or the system 100. It should be understood that the model 600 may include any suitable parameters in addition to or instead of those described herein, such as a barometric pressure parameter, and the like.

The controlling device 102 may, at a first characterization period (e.g., which may include a start of the material bead dispensing operation) of the material bead dispensing operation, communicate, to the material dispenser 116, a first characterization flow rate input. The controlling device 102 may, at a second characterization period (e.g., which may include a period following the first period) of the material bead dispensing operation, communicate, to the material dispenser 116, a second characterization flow rate input. It should be understood that the first period and the second period may include any suitable periods and may be of any suitable length. The first characterization flow rate input and the second characterization flow rate input may correspond to a step function, the first characterization flow rate input and second characterization flow rate input may include arbitrary values, and/or the first characterization flow rate input and the second characterization flow rate input may relate to one another in any suitable fashion or be unrelated to one another.

The controlling device 102 may be configured to characterize at least one parameter of the model 600. For example, the controlling device 102 may generate, using various sensors 160, three-dimensional data associated with a material bead corresponding to the material bead dispensing operation. The various sensors may include one or more triangulation lasers, one or more image capturing devices, one or more other suitable sensors, or a combination thereof.

The controlling device 102 may characterize at least one parameter of the model 600 of using at least the first characterization flow rate input, the second characterization flow rate input, and the three-dimensional data associated with the material bead. For example, the controlling device 102 may analyze, using the three-dimensional data, aspects of the material bead corresponding to the first flow rate input and aspects of the material bead corresponding to the second flow rate input.

The controlling device 102 may compare expected material bead volumes corresponding to the first flow rate input with actual material bead volumes corresponding to the first flow rate input, compare expected material bead volumes corresponding to the second flow rate input with actual material bead volumes corresponding to the second flow rate input, and/or compare an expected shaped of the material bead with the actual shape of the material bead. The controlling device 102 may determine variances between the expected aspects of the material bead and the actual aspects of the material bead. The controlling device 102 may characterize at least one of the gain and offset parameter 602, the delay parameter 604, and the first order low pass parameter 606 based on the variances.

In some embodiments, the controlling device 102 may be configured to calculate an inverse for each parameter of the model 600. For example, the controlling device 102 may, using a desired flow rate command, calculate an inverse for each parameter of the model 600. The controlling device 102 may use the inverse of each parameter of the model 600 to determine a flow rate input, which, when applied to the material dispenser 116, generates a material bead corresponding to the flow rate command. The controlling device 102 may characterize at least one parameter of the model 600 based on a comparison of the flow rate command, the flow rate input, and three-dimensional data corresponding to the material bead.

In some embodiments, the controlling device 102 may be configured to control the material dispenser to dispense a straight line bead according to a first flow rate input and, substantially half way through the dispensing of the material bead, increase the first flow rate input according to a step function. The controlling device 102 may characterize the at least one parameter of the model 600 based on three-dimensional data corresponding to the change in material output associated with the increase in flow rate input. Additionally, or alternatively, the controlling device 102 may uses arbitrary, known, flow rate inputs during dispensing of the material bead. The controlling device 102 may characterize the at least one parameter based on three-dimensional data corresponding to material bead associated with the arbitrary flow rate inputs.

In some embodiments, the controlling device 102 may selectively control the material dispenser 116 to dispense material, according to a flow rate input, into a container, such as a bucket or other suitable container. The controlling device 102 may receive, from various sensors associated with the material dispenser 116 (e.g., internal sensors or proximate sensors of the material dispenser 116), material output measurements indicating actual material output of the material dispenser 116. The controlling device 102 may characterize the at least one parameter of the model 600 based on a comparison between the flow rate input and the actual material output received from the sensors of the material dispenser 116.

In some embodiments, the container may be disposed on a scale. The controlling device 102 may receive, from the scale, a measurement corresponding to a weight of the material dispensed by the material dispenser 116. The controlling device 102 may determine an expected weight of the material to be dispensed according to the flow rate input. The controlling device 102 may characterize the at least one parameter of the model 600 based on the flow rate input, the expected weight of the material, the actual weight of the material, and/or the material output provided by the sensors of the material dispenser 116. Additionally, or alternatively, the controlling device 102 may vary the flow rate of the material dispenser 116 by providing varied flow rate inputs. The controlling device 102 may characterize the at least one parameter of the model 600 based on the varied flow rate inputs and corresponding weights of the material dispensed in response to each flow rate input (e.g., based on the varied flow rate inputs, the expected weights for each flow rate input, the actual weights of the material, and/or the material output provided by the sensors of the material dispenser 116).

In some embodiments, the controlling device 102 may locally adjust aspects of the material bead based on measurements of each material bead dispensed by the material dispenser 116. For example, the controlling device 102 may analyze, using three-dimensional data, a material bead after the material bead is dispensed by the material dispenser 116. The controlling device 102 may identify inconsistent areas of the material bead (e.g., which may include areas of the material bead having volumes that are inconsistent with desired volumes of the material bead). The controlling device 102 may selectively adjust the flow rate input on subsequent dispenses of similar material beads to address the inconsistent areas of the material bead (e.g., by increase and/or decreasing the flow rate input at the inconsistent areas of the material bead).

The controlling device 102 may revise the model 600 by updating the at least one parameter of the model 600. The controlling device 102 may store the revised model 600 in memory, such as in the memory 106 or other suitable location. The controlling device 102 may generate, in response to receiving a material dispense command, a material dispense flow rate input according to the revised model 600. The controlling device 102 may generate, using the sensors 160, three-dimensional data associated with at least one other material bead corresponding to another material bead dispensing operation associated with the material dispense flow rate input.

In some embodiments, the controlling device 102 may iteratively revise the model 600 using, at least, three-dimensional data, generated the sensors 160, associated with a plurality of other material beads corresponding to other material bead dispensing operations.

In some embodiments, as described, the model 600 may include the temperature parameter 610. The controlling device 102 may be configured to capture an ambient temperature associated period of characterization of the other parameters of the model 600. The controlling device 102 may store the captured temperature as the temperature parameter 610 with the other parameters of the model 600.

For example, the other parameters of the model 600 may vary with changes in temperature, may vary at specific absolute temperatures, and the like. The controlling device 102 may, in response to receiving a flow rate command, determine an ambient temperature of the system 100. The controlling device 102 may identify parameters of the model 600 corresponding to the temperature (e.g., the parameters may be stored according to a range of temperatures, according to a various in a previous temperature and a current temperature, according to an absolute temperate, and the like). The controlling device 102 may revise the model 600 according to the identified parameters (e.g., corresponding to the temperature). The controlling device 102 may generate the flow rate input based on the revised model 600.

In some embodiments, the controlling device 102 may be configured to determine, using a flow rate input and an expected pre-pressure, pre-pressure characteristics of the material dispenser 116. The pre-pressure characteristics may indicate a rate at which the pre-pressure of the material dispenser builds up prior to dispensing material. The controlling device 102 may selectively adjust parameters of the model 600 based on analyzing the actual pre-pressure characteristics with the expected pre-pressure characteristics. The controlling device 102 may selectively control pre-pressure characteristics of the material dispenser 116 by adjusting the flow rate input accordingly.

In some embodiments, the controlling device 102 may be configured to characterize a model of the robotic mechanisms 114. The model of the robotic mechanism 114 may include features similar to or different from the model 600. The controlling device 102 may characterize parameters of the model of the robotic mechanism 114, as described.

The controlling device 102 may selectively control the speed of the robotic mechanism 114 based on the model of the robotic mechanism 114. For example, the robotic mechanism 114 may traverse a predefined path along the component. The controlling device 102 may increase and/or decrease the speed of the robotic mechanism 114 at identified areas of the path based on the characterized model of the robotic mechanism 114.

In some embodiments, the controlling device 102 may overdrive (e.g., in a positive direction or a negative direction) the material dispenser 116. For example, the controlling device 102 may determine, based on the model 600, that the material dispenser 116 may not be capable, given a time constraint, to deliver a flow rate corresponding to flow rate command. The controlling device 102 may overdrive (e.g., increase or decrease flow rate to a maximum or minimum limit) to achieve the flow rate corresponding to the flow rate command.

In some embodiments, the controlling device 102 may be configured to reduce, minimize, or eliminate an error between a desired material bead volume and an actual material bead volume. For example, the controlling device 102 may adjust the flow rate inputs provided to the material dispenser 116, as described. Additionally, or alternatively, the controlling device 102 may selectively adjust a speed of the robotic mechanism 114 to further reduce, minimize, or eliminate the error between the desired material bead volume and the actual material bead volume. For example, the controlling device 102 may selectively decrease the speed of the robotic mechanism 114 in an area on the component where the material dispenser 116 is unable to maintain the desired flow rate and/or increase the speed of the robotic mechanism 114 where the material dispenser 116 is able to dispense the material bead at a higher rate than the desired flow rate.

In some embodiments, the controlling device 102 and/or the system 100 may perform the methods described herein. However, the methods described herein as performed by the controlling device 102 and/or system 100 are not meant to be limiting, and any type of software executed on a controller can perform the methods described herein without departing from the scope of this disclosure. For example, a controller, such as a processor executing software within a computing device, can perform the methods described herein.

Figure 7:
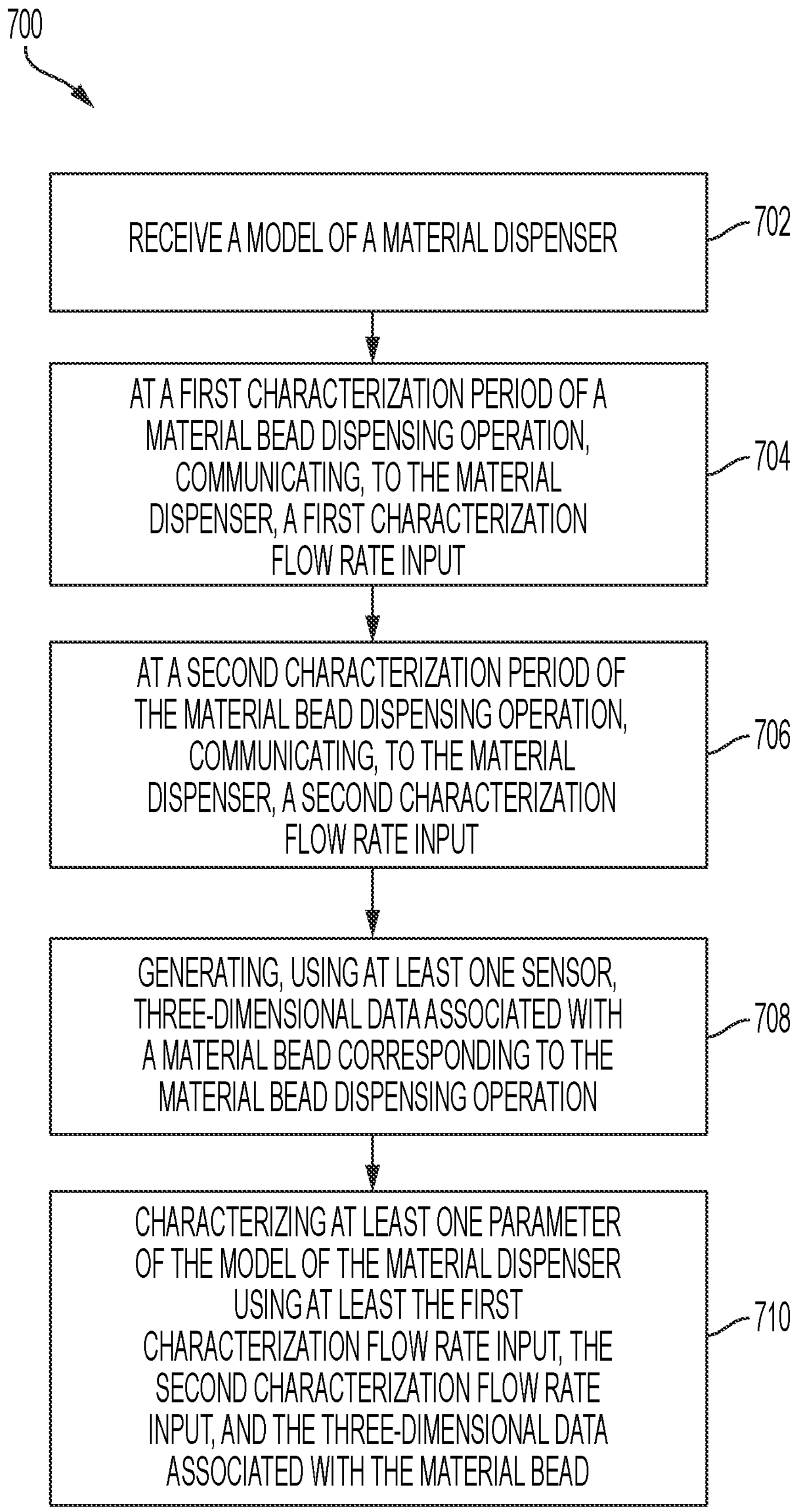
FIG. 7 is a flow diagram generally illustrating a material dispenser characterization method according to the principles of the present disclosure.

FIG. 7 is a flow diagram generally illustrating a material dispenser characterization method 700 according to the principles of the present disclosure. At 702, the method 700 receives a model of the material dispenser. For example, the controlling device 102 may receive the model 600.

At 704, the method 700, at a first characterization period of a material bead dispensing operation, communicates, to the material dispenser, a first characterization flow rate input. For example, the controlling device 102 may, at the first characterization period of the material bead dispensing operation, communicate the first characterization flow rate input to the material dispenser 116.

At 706, the method 700, at a second characterization period of the material bead dispensing operation, communicate, to the material dispenser, a second characterization flow rate input. For example, the controlling device 102 may, at the second characterization period of the material bead dispensing operation, communicate the second characterization flow rate input to the material dispenser 116.

At 708, the method 700 generates, using at least one sensor, three-dimensional data associated with a material bead corresponding to the material bead dispensing operation. For example, the controlling device 102 may generate, using the sensors 160, three-dimensional data associated with the material bead corresponding to the material bead dispensing operation.

At 710, the method 700 characterizes at least one parameter of the model of the material dispenser using at least the first characterization flow rate input, the second characterization flow rate input, and the three-dimensional data associated with the material bead. For example, the controlling device 102 may characterize the at least one parameter of the model 600 of the material dispenser 116 using at least the first characterization flow rate input, the second characterization flow rate input, and the three-dimensional data associated with the material bead Clause 1. A method for characterizing a material dispenser, the method comprising: receiving a model of the material dispenser; at a first characterization period of a material bead dispensing operation, communicating, to the material dispenser, a first characterization flow rate input; at a second characterization period of the material bead dispensing operation, communicating, to the material dispenser, a second characterization flow rate input; generating, using at least one sensor, three-dimensional data associated with a material bead corresponding to the material bead dispensing operation; and characterizing at least one parameter of the model of the material dispenser using at least the first characterization flow rate input, the second characterization flow rate input, and the three-dimensional data associated with the material bead.

Clause 2. The method of clause 1, wherein the first characterization flow rate input and the second characterization flow rate input correspond to a step function.

Clause 3. The method of clause 1, wherein the first characterization flow rate input and second characterization flow rate input include arbitrary values.

Clause 4. The method of clause 1, wherein the three-dimensional data corresponds to at least one portion of the material bead comprising a predefined pattern.

Clause 5. The method of clause 4, wherein the predefined pattern includes a straight line.

Clause 6. The method of clause 1, wherein characterizing the at least one parameter of the model of the material dispenser includes: revising the model of the material dispenser by updating the at least one parameter of the model of the material dispenser; and storing the revised model of the material dispenser.

Clause 7. The method of clause 6, further comprising generating, in response to receiving a material dispense command, a material dispense flow rate input according to the revised model of the material dispenser.

Clause 8. The method of clause 7, further comprising generating, using the at least one sensor, three-dimensional data associated with at least one other material bead corresponding to another material bead dispensing operation associated with the material dispense flow rate input.

Clause 9. The method of clause 1, iteratively revising the model of the material dispenser using, at least, three-dimensional data, generated using the at least one sensor, associated with a plurality of other material beads corresponding to other material bead dispensing operations.

Clause 10. The method of clause 1, the at least one sensor includes a laser.

Clause 11. The method of clause 1, wherein the at least one sensor includes an image capturing device.

Clause 12. An apparatus for characterizing a material dispenser, the apparatus comprising: a processor; and a memory including instructions that, when executed by the processor, cause the processor to: receive a model of the material dispenser; at a first characterization period of a material bead dispensing operation, communicate, to the material dispenser, a first characterization flow rate input; at a second characterization period of the material bead dispensing operation, communicate, to the material dispenser, a second characterization flow rate input; generate, using at least one sensor, three-dimensional data associated with a material bead corresponding to the material bead dispensing operation; and characterize at least one parameter of the model of the material dispenser using at least the first characterization flow rate input, the second characterization flow rate input, and the three-dimensional data associated with the material bead.

Clause 13. The apparatus of clause 12, wherein the first characterization flow rate input and the second characterization flow rate input correspond to a step function.

Clause 14. The apparatus of clause 12, wherein the first characterization flow rate input and second characterization flow rate input include arbitrary values.

Clause 15. The apparatus of clause 12, wherein the three-dimensional data corresponds to at least one portion of the material bead comprising a predefined pattern.

Clause 16. The apparatus of clause 15, wherein the predefined pattern includes a straight line.

Clause 17. A system comprising: a material dispenser configured to dispense a material bead; and a controlling mechanism configured to: receive a model of the material dispenser; at a first characterization period of a material bead dispensing operation, communicate, to the material dispenser, a first characterization flow rate input; at a second characterization period of the material bead dispensing operation, communicate, to the material dispenser, a second characterization flow rate input; generate, using a plurality of sensors, three-dimensional data associated with a material bead corresponding to the material bead dispensing operation; and characterize at least one parameter of the model of the material dispenser using at least the first characterization flow rate input, the second characterization flow rate input, and the three-dimensional data associated with the material bead.

Clause 18. The system of clause 17, wherein the plurality of sensors includes at least one laser.

Clause 19. The system of clause 17, wherein the plurality of sensors includes at least one image capturing device.

Clause 20. The system of clause 17, wherein the plurality of sensors includes at least one laser and two or more image capturing devices.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for controlling a material dispenser, the method comprising:

receiving a model of the material dispenser;

at a first period of a material bead dispensing operation, communicating, to the material dispenser, a first flow rate input;

at a second period of the material bead dispensing operation, communicating, to the material dispenser, a second flow rate input;

generating, using at least one sensor, three-dimensional data associated with a material bead corresponding to the material bead dispensing operation;

revising the model of the material dispenser by updating at least one parameter of the model of the material dispenser using at least the first flow rate input, the second flow rate input, and the three-dimensional data associated with the material bead; and controlling, using the updated model of the material dispenser, the material dispenser to dispense one or more material beads.

2. The method of claim 1, wherein the first flow rate input and the second flow rate input correspond to a step function.

3. The method of claim 1, wherein the first flow rate input and second flow rate input include arbitrary values.

4. The method of claim 1, wherein the three-dimensional data corresponds to at least one portion of the material bead comprising a predefined pattern.

5. The method of claim 4, wherein the predefined pattern includes a straight line.

6. The method of claim 1, further comprising generating, in response to receiving a material dispense command, a material dispense flow rate input according to the revised model of the material dispenser.

7. The method of claim 1, further comprising generating, using the at least one sensor, three-dimensional data associated with at least one other material bead corresponding to another material bead dispensing operation associated with the material dispense flow rate input.

8. The method of claim 1, iteratively revising the model of the material dispenser using, at least, three-dimensional data, generated using the at least one sensor, associated with a plurality of other material beads corresponding to other material bead dispensing operations.

9. The method of claim 1, the at least one sensor includes a laser.

10. The method of claim 1, wherein the at least one sensor includes an image capturing device.

11. An apparatus for controlling a material dispenser, the apparatus comprising:

a processor; and a memory including instructions that, when executed by the processor, cause the processor to:

receive a model of the material dispenser;

at a first period of a material bead dispensing operation, communicate, to the material dispenser, a first flow rate input;

at a second period of the material bead dispensing operation, communicate, to the material dispenser, a second flow rate input;

generate, using at least one sensor, three-dimensional data associated with a material bead corresponding to the material bead dispensing operation;

revise the model of the material dispenser by updating at least one parameter of the model of the material dispenser using at least the first flow rate input, the second flow rate input, and the three-dimensional data associated with the material bead; and control, using the updated model of the material dispenser, the material dispenser to dispense one or more material beads.

12. The apparatus of claim 11, wherein the first flow rate input and the second flow rate input correspond to a step function.

13. The apparatus of claim 11, wherein the first flow rate input and second flow rate input include arbitrary values.

14. The apparatus of claim 11, wherein the three-dimensional data corresponds to at least one portion of the material bead comprising a predefined pattern.

15. The apparatus of claim 14, wherein the predefined pattern includes a straight line.

16. A system comprising:

a material dispenser configured to dispense a material bead; and a controlling mechanism configured to:

receive a model of the material dispenser;

at a first period of a material bead dispensing operation, communicate, to the material dispenser, a first flow rate input;

at a second period of the material bead dispensing operation, communicate, to the material dispenser, a second flow rate input;

generate, using a plurality of sensors, three-dimensional data associated with a material bead corresponding to the material bead dispensing operation;

revising the model of the material dispenser by updating at least one parameter of the model of the material dispenser using at least the first flow rate input, the second flow rate input, and the three-dimensional data associated with the material bead; and control, using the updated model of the material dispenser, the material dispenser to dispense one or more material beads.

17. The system of claim 16, wherein the plurality of sensors includes at least one laser.

18. The system of claim 16, wherein the plurality of sensors includes at least one image capturing device.

19. The system of claim 16, wherein the plurality of sensors includes at least one laser and two or more image capturing devices.

* * * * *